Sept. 26, 1967
C. C. DE PEW ETAL
3,343,707
CLOSURE CAP FOR FUEL TANKS
Filed Oct. 22, 1965
2 Sheets-Sheet 1
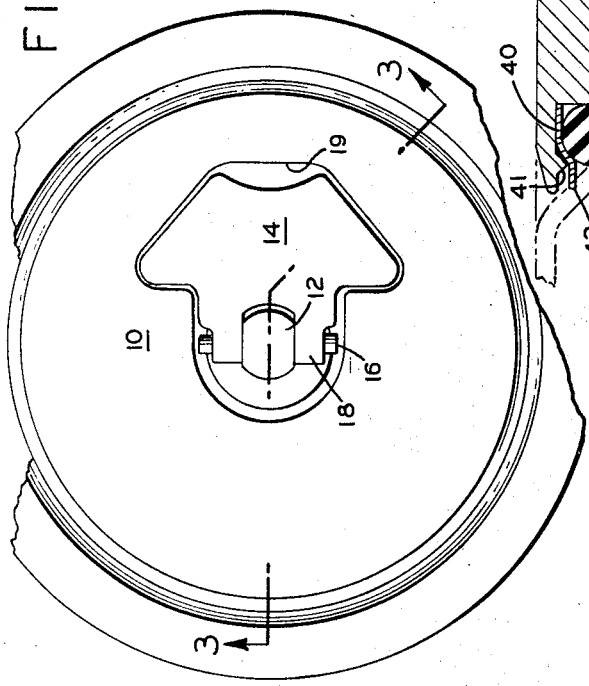
INVENTORS.
CHESTER C. DE PEW
ANTHONY J. BACEWICZ
BY
JOHN P. CHANDLER
HIS ATTORNEY.

Sept. 26, 1967 C. C. DE PEW ETAL 3,343,707
CLOSURE CAP FOR FUEL TANKS
Filed Oct. 22, 1965 2 Sheets-Sheet 2

INVENTORS.
CHESTER C. DE PEW
ANTHONY J. BACEWICZ
BY JOHN P. CHANDLER
HIS ATTORNEY.

United States Patent Office 3,343,707
Patented Sept. 26, 1967

3,343,707
CLOSURE CAP FOR FUEL TANKS
Chester C. De Pew, Farmingdale, N.Y., and Anthony J. Bacewicz, Hartford, Conn., assignors to Chester Corporation, Wilton, Conn.
Filed Oct. 22, 1965, Ser. No. 501,628
13 Claims. (Cl. 220—25)

This invention relates to a filler cap assembly used in conjunction with a metal adapter ring for fuel tanks for aircraft, and relates more particularly to an improved cap construction having a greater safety factor against fatalities caused by electrical discharges produced by static electricity, lightning or other source igniting vapors in the tank, than existing caps.

An important object of the invention is to provide a novel configuration of a tank closure cap or plate wherein any electrical charge capable of causing a spark must occur on the outside of the tank and thus be conducted harmlessly to ground.

This is achieved by providing an electrical discharge baffle above the usual fluid pressure seal on tanks of this character, and the use of plastic or other material for a fluid seal retainer.

The electrical discharge baffle performs two important functions. First it restricts any electrical arcing to the small gap between the rim of cap and the adapter at the exterior of the tank. Secondly, it protects the fluid seal from being damaged by electrical discharge pressure and bits of hot molten metal produced by electrical arcing. It also prevents electrical sparks caused by an electrical discharge entering the cavity just above the tank and fluid seal.

The function of the plastic retainer, besides retaining the fluid seal, is to create a longer air gap between metallic parts of the cap and the metal adapter, on the inside of the tank, than the air gap between the rim of the cap and the adapter on the outside of the tank.

In the case of an electrical discharge in the area directly above or adjacent to the cap caused by static electricity or lightning, the spark can only occur in this narrow annular area of the cap above the electrical baffle because of the narrower area for possible discharge than exists any other place, inside or outside of the tank. The force of the charge is thus spent outside the tank and cannot follow the shaft down into the tank, primarily because the fluid seal retainer is formed of plastic material, thus eliminating any gap which could serve as a sparking area inside the tank.

In the preferred embodiment of the invention, the electrical baffle is in physical contact or is actually formed integrally with, i.e. one piece, with the final seal but in another form of the invention it is separated from the fluid seal ring by a plastic retaining ring.

In the drawings:

FIG. 1 is a plan view of a closure plate embodying the present invention;

FIG. 2 is a side elevation thereof with the parts shown in closed position;

FIG. 3 is an enlarged section taken on line 3—3 of FIG. 1;

Figure 4:
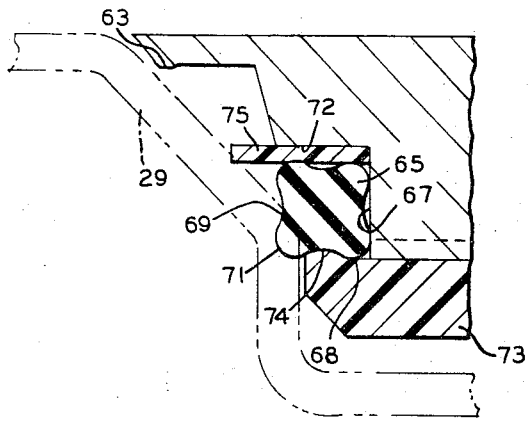
FIG. 4 is a broken section through a modified form of closure cap of the present invention.

The first embodiment of the filler cap assembly of the present invention is shown in FIGS. 1–3 and it includes a closure plate 10 which may be cast from metal and is provided with a central opening 11 forming a bearing for a pressure plate carried on a shaft 12 which carries a handle 14 at its upper end supported by a pivot pin 16 passing through ears 18. The upper face of the closure plate is suitably recessed at 19 to receive the handle in flush relation when the parts of the cap assembly are in closed position.

As is usual in filler cap assemblies, the handle has a curved surface 20 on its lower face which operates against a wear ring 21 to pull the shaft upwardly when the handle is moved from vertical, open position to the horizontal closed position shown.

The upper rim of the cap has a bevelled section 24 and the peripheral edge 26 of this rim is closely spaced from the inclined face 28 of the adapter ring shown in broken lines at 29. This narrow annular area causes any electrical discharge to occur here and not at any other area outside or inside of the tank. This bevelled edge may, of course, be eliminated but it eliminates high speed air from hitting an otherwise sharp edge. In other words, the bevel causes the air to be guided more evenly over the top of the cap and thus causes no turbulence.

A resilient ring 30 to effect the actual fluid seal between the cap and the adapter ring secured to the tank (not shown) is received in a recess 31 which is right angular in cross section and engages the curved annular seat 32 of the adapter in sealing relation. The O-ring is held in firm engagement with the upper annular wall of the recess 31 by a ring 34 of plastic or other insulating material seated in a recess 36 which is right angular in cross section and which is retained in the seat by suitable means such as a rim 38. At its outer margin, the ring has an upper recess providing a narrow contact 39 for resilient ring 30. This arrangement permits the fluid sealing ring to be displaced partly into the recess in the case of too tight a fit.

Above the fluid sealing ring is a circular ring 40 of insulating material to form an annular electrical baffle and this ring is urged downwardly by an annular rib 41. At the left in FIG. 3, the outer margin 42 of the ring is shown in the position it occupies when the cap is removed from the adapter while at the right hand side the rim is shown in contact with the adapter and is, therefore, curled slightly upwardly.

Retainer ring 34 of insulating material has a plurality of downwardly extending lugs 44 having extension 45 both of which pass into slots 46 in the lower annular wall 48 of the adapter 29 and act as stops to assure proper positioning of the cap when inserted. When in this position, the closure plate 10 is urged downwardly by a pressure plate 49 preferably molded or machined from plastic material and formed at its center with hub 50 which extends upwardly almost to wear ring 21 and provided with a central vertical bore 51 forming a bearing for the shaft 12. The upper section of the hub has an annular recess 22 to receive a resilient ring for fluid sealing purposes. In this fashion, there is no possibility of any arcing occurring on the tank side of the resilient ring 23 as a result of a pressure blast past this ring. On its outer periphery, the pressure plate has lugs 52 which are aligned with lugs 44 of ring 34 when the cap is first placed in the adapter, and the entire pressure plate including its lugs 52 pass below the lower annular wall of the base 48 of the adapter ring. When this is done, the handle is given a turn of about 45° to move clamping lugs 52 away from slots 46, after which the handle is moved down to the position of FIG. 3 where a boss 45 on the handle contacts wear ring 21 and the seal is complete. The shaft 12, which has a head 47 at its lower end, is engaged by a plastic button 54 the latter being froce fitted into a lower opening 56 in the pressure plate 49. The button has an upwardly extending stud portion 57 received in force fit relation in an axial opening 59 in shaft 12. This button forms a surface corresponding to the lower curved surface of pressure plate 49. A lanyard 58 secured to a boss 61 carried by plastic button 54 keeps the closure cap captive relative to the tank. When in unlocked position, the pressure plate is urged downwardly relative to the cap by a spring 60.

It will be noted that the only metallic portion of the closure cap which is in close proximity to the metal adapter ring is the rim 26 which is located above and closely spaced from electrical baffle ring 40.

In the modified form of the invention shown in FIG. 4, the closure cap has the same narrow gap between the rim 63 and the adapter ring 29 and a substantially square fluid seal ring 65 is positioned in a recess 67 generally right angular in cross section, has a 4-sided configuration with alternate recesses 69 and protuberances 68 with a substantially flat electrical baffle 71 positioned between the square fluid seal ring and a flat seat 72.

The liquid sealing ring is retained in its recess by means of a generally flat retainer 73 formed of insulating material and having a rim 74 convex in cross section which fits in one of the recesses in the fluid seal ring. When the closure cap of FIG. 4 is inserted within the adapter 29, the lower left hand projecting portion 71 is, of course, forced radially inwardly.

Figure 5:
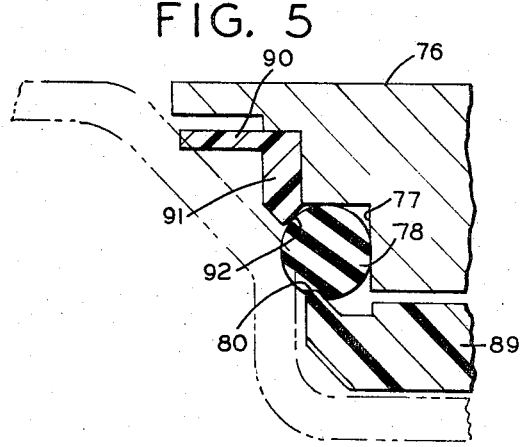
FIG. 5 is a similar view showing another modified form.

In the arrangement of FIG. 5, the closure cap 76 has an angular recess 77 for the O ring 78 which is engaged by a flat plastic ring 89 having a projection 80 similar to that shown in FIG. 3. The electrical baffle ring has a flat sealing portion 90 and a vertical portion 91 having a diagonal lower edge 92 which lies adjacent the O ring.

Figure 6:
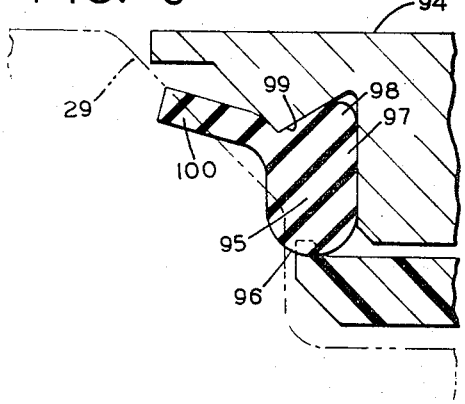
FIG. 6 is a similar view showing a third modified form.
Figure 7:
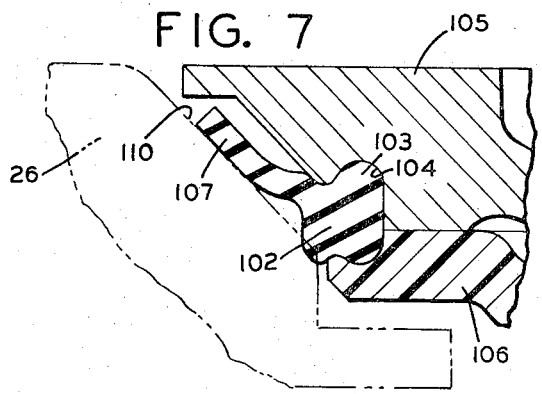
FIG. 7 shows a fourth modified form.

In the embodiment illustrated in FIG. 6, the closure cap 94 has a liquid sealing ring 95 of irregular configuration with a curved lower surface 96 substantially parallel side edges 97 and upper inner portion 98 which extends into an annular V-shaped slot 99 and an annular wing portion 100 which is moved rearwardly in a bending stress when placed in adapter ring 29. A somewhat similar configuration of liquid sealing ring is shown at 102 in FIG. 7 wherein the inner section of the seal 103 is received in a recess 104 in the closure cap 105 and extending into the plastic retainer ring 106. The annular wing portion 107 is shown herein in sealing relation which the diagonal surface 110 of the adapter ring 26 and is under a bending stress.

Figure 8:
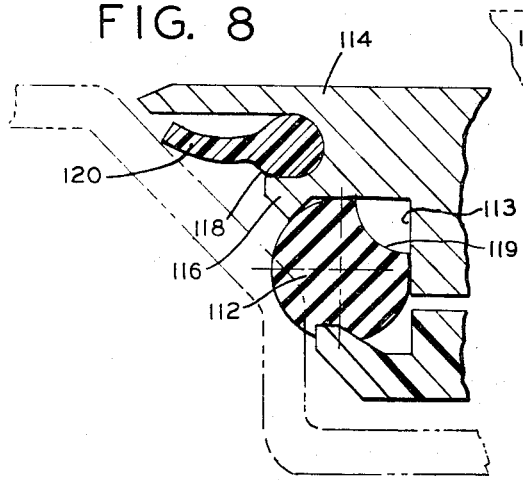
FIG. 8 shows a fifth modified form.
Figure 9:
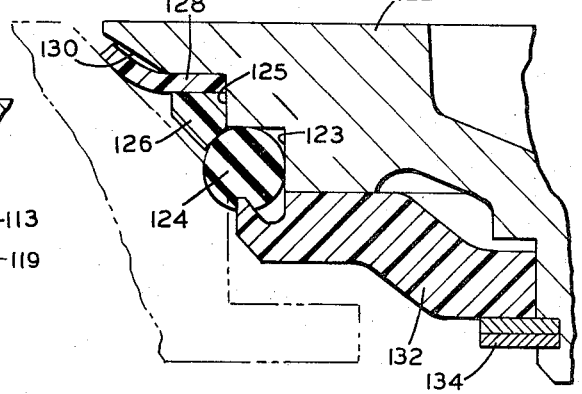
FIG. 9 shows the final modified form.

In FIG. 8, the fluid sealing ring 112 is again retained in a right angular recess 113 in the closure plate 114 and the plate has an annular projection 116 separating the fluid seal ring from the electrical baffle which in this instance has an inner portion 118 generally circular in cross section and with a laterally extending annular wing portion 120 which engages the adapter under a bending stress. The fluid seal ring 112 is not circular in cross section but has a concave recess 119 on its upper, inner edge to give the ring more room to swell due to saturation of the fuel. In the final form of the invention shown in FIG. 9, the closure cap 122 has an annular recess 123, right angular in cross section, for the fluid sealing O ring 124 and a second right angular recess 125 to receive a plastic retaining ring 126 which engages the O ring at its lower diagonal edge and engages flat electrical baffle 128 at its upper end. The outer margin of this baffle is flat unless it is under a bending stress which it is in FIG. 9, by virture of contact with the adapter. In this case, the lower face of the closure cap has a diagonal margin 130. The retaining ring 132 for the fluid sealing O ring is retained in position by a sheet metal retaining ring 134 formed with two convolutions.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What we claim is:

1. A filler cap assembly for a fuel tank fitted with an adapter to receive the assembly in secured relation and including a removable filler cap whose outer rim is closely spaced from the adapter ring, a resilient fluid sealing ring below said rim, a retaining ring of insulating material below the resilient ring for retaining the latter, and an electrical baffle seal ring above the resilient ring, a pressure plate of insulating material rotatably carried below said filler cap and formed with lugs which underlie the adapter ring when the assembly is closed.

2. The structure recited in claim 1 wherein the resilient ring is substantially square and the seal ring is initially flat.

3. The structure recited in claim 1 wherein the seal ring is formed with the resilient ring in one piece.

4. The structure recited in claim 1 wherein the filler cap has two annular seats, one for the resilient ring and one for the seal ring, the latter being substantially L-shaped in cross section.

5. The structure recited in claim 1 wherein the seal ring has an inner section which is substantially round in cross section and the outer section is substantially flat and is under a bending stress when in contact with the adapter ring.

6. The structure recited in claim 1 wherein the seal ring is a relatively long flat annular extension of the resilient ring and engages a substantial area of the adapter.

7. The structure recited in claim 1 wherein the two rings are separated by a ring formed of insulating material.

8. A filler cap assembly for a fuel tank fitted with an adapter to receive the assembly in secured relation, and including a removable metallic filler cap whose outer rim is closely spaced from the adapter ring, the cap being formed with an annular seat below said rim, a resilient fluid sealing ring in said annular seat, a retaining ring of insulating material below the resilient ring for retaining the latter in the seat, and a seal ring forming an electrical baffle between the top of the seat and the resilient ring and whose rim engages the adapter ring under a bending stress, a pressure plate of insulating material rotatably carried below said filler cap and formed with lugs which underlie the adapter ring when the assembly is closed.

9. The structure recited in claim 8 wherein the fluid sealing ring is circular in cross section.

10. The structure recited in claim 8 wherein the cross-sectional shape of the fluid seal ring is circular except for its inner, upper section which has an arcuate recess.

11. The structure recited in claim 8 wherein the pressure plate is formed with a central hub extending up into the filler cap, the parts having an annular recess therebetween, and a resilient sealing ring disposed in said recess.

12. A filler cap assembly for a fuel tank fitted with an adapter ring to receive the assembly in secured relation and including a removable filler cap having a central bore and whose outer rim is closely spaced from the adapter ring, a resilient fluid sealing ring below said rim, a retaining ring of insulating material below the resilient ring for retaining the latter, and a seal ring forming an electrical baffle above the resilient ring and whose rim firmly engages the adapter ring, a pressure plate of insulating material formed with a central hub extending up through the filler cap bore and being rotatable therein, said filler cap formed with lugs which underlie the adapter ring when the assembly is rotated to closed position, and a shaft secured in non-rotative relation in the pressure plate bore to rotate the pressure plate and lugs to said closed position.

13. A filler cap assembly for a fuel tank fitted with an adapter ring to receive the assembly in secured relation and including a removable filler cap having a central bore and whose outer rim is closely spaced from the adapter ring, a resilient fluid sealing ring below said rim, a retaining ring of insulating material below the resilient ring for retaining the latter, and a seal ring forming an electrical baffle above the resilient ring and whose rim firmly engages the adapter ring, a pressure plate of insulating material rotatably carried below said filler cap and formed with lugs which underlie the adapter ring when the assembly is closed, said plate having a central hub extending upwardly into the filler cap bore, a shaft secured in non-rotative relation in the bore and a camming handle on the shaft for drawing the pressure plate and filler cap together.

References Cited

UNITED STATES PATENTS 3,289,876   12/1966   De Pew _____ 220—25

THERON E. CONDON, *Primary Examiner.*

G. T. HALL, *Assistant Examiner.*